(12) United States Patent
Berns

(10) Patent No.: US 8,740,464 B2
(45) Date of Patent: Jun. 3, 2014

(54) BEARING ASSEMBLY HAVING A FLOATING SEAL

(75) Inventor: Mark I. Berns, Northbrook, IL (US)

(73) Assignee: Rexnord Industries, LLC, Milwaukee, WI (US)

( * ) Notice: Subject to any disclaimer, the term of this patent is extended or adjusted under 35 U.S.C. 154(b) by 0 days.

(21) Appl. No.: 13/287,789

(22) Filed: Nov. 2, 2011

(65) Prior Publication Data

US 2013/0108200 A1    May 2, 2013

(51) Int. Cl.
  *F16C 33/76* (2006.01)
  *F16C 23/08* (2006.01)
  *F16J 15/00* (2006.01)

(52) U.S. Cl.
  USPC ........... 384/477; 384/495; 384/558; 277/579; 277/581

(58) Field of Classification Search
  USPC ......... 384/145, 146, 477, 484, 495, 496, 497, 384/498, 558; 277/579, 580, 581
  See application file for complete search history.

(56) References Cited

U.S. PATENT DOCUMENTS

| | | |
|---|---|---|
| 662,374 A | 11/1900 | Dooley |
| 1,469,991 A | 10/1923 | Armstrong |
| 1,528,363 A | 3/1925 | Bronander |
| 1,646,947 A | 10/1927 | Armstrong |
| 1,781,886 A | 11/1930 | Scribner |
| 1,910,184 A | 5/1933 | Scribner |
| 1,973,994 A | 9/1934 | Peterson |
| 2,298,463 A | 10/1942 | Burt, Jr. |
| 2,486,123 A | 10/1949 | Cottrell |
| 2,592,082 A | 4/1952 | Trumpler |
| 2,653,064 A | 9/1953 | Heim |
| 2,767,037 A * | 10/1956 | Williams ................. 384/482 |
| 3,141,708 A | 7/1964 | Evangelista |
| 3,655,251 A | 4/1972 | Evenson |
| 3,768,881 A | 10/1973 | Bender et al. |
| 3,866,985 A | 2/1975 | Whitehurst |
| 3,936,102 A | 2/1976 | Riegler et al. |
| 4,379,600 A | 4/1983 | Muller |
| 4,557,613 A | 12/1985 | Tallian et al. |
| 4,674,993 A | 6/1987 | Mazziotti et al. |
| 4,705,411 A | 11/1987 | Kellstrom |

(Continued)

FOREIGN PATENT DOCUMENTS

| | | |
|---|---|---|
| DE | 1020499 B | 12/1957 |
| DE | 3926493 A1 | 2/1991 |

(Continued)

OTHER PUBLICATIONS

AMI Bearings, Inc., High Temperature Bearings up to 450, Mount Prospect, Illinois.

(Continued)

*Primary Examiner* — James Pilkington
*Assistant Examiner* — Adam D Rogers
(74) *Attorney, Agent, or Firm* — Quarles & Brady LLP

(57) ABSTRACT

The bearing assembly concept includes a floating seal arrangement. In one form, a bearing assembly comprises a first bearing member and a second bearing member that is oriented adjacent to the first bearing member. A plurality of bearings is positioned between the first bearing member and the second bearing member. A shield is engaged with the first bearing member, and a floating seal is slidably engaged with the shield and the second bearing member. The shield captures the floating seal adjacent to the second bearing member.

20 Claims, 6 Drawing Sheets

(56) References Cited

U.S. PATENT DOCUMENTS

| | | |
|---|---|---|
| 4,755,067 A | 7/1988 | Asberg et al. |
| 4,763,905 A | 8/1988 | Zvonar |
| 4,808,012 A | 2/1989 | Otto |
| 4,872,770 A | 10/1989 | Dickinson |
| 4,893,387 A | 1/1990 | Akamatsu et al. |
| 4,960,334 A | 10/1990 | Mazziotti |
| 5,000,587 A | 3/1991 | Hawley |
| 5,002,406 A | 3/1991 | Morton et al. |
| 5,005,992 A | 4/1991 | Dreschmann et al. |
| 5,080,502 A | 1/1992 | Diedrich |
| 5,119,446 A | 6/1992 | Grafstrom et al. |
| 5,232,292 A | 8/1993 | Stackling et al. |
| 5,242,229 A | 9/1993 | McLarty |
| 5,310,269 A | 5/1994 | Wardle et al. |
| 5,340,124 A | 8/1994 | Jankowski et al. |
| 5,352,047 A | 10/1994 | Ingall et al. |
| 5,441,351 A | 8/1995 | Grunze |
| 5,582,483 A * | 12/1996 | Grunze et al. ............... 384/572 |
| 5,839,834 A | 11/1998 | Acampora, Jr. |
| 5,882,121 A | 3/1999 | Saigusa |
| 6,217,220 B1 * | 4/2001 | Ohkuma et al. ............. 384/489 |
| 6,276,837 B1 | 8/2001 | Iwano |
| 6,315,458 B1 | 11/2001 | Unno et al. |
| 6,354,745 B1 | 3/2002 | Ai |
| 6,394,656 B1 * | 5/2002 | Williams .................... 384/450 |
| 6,406,187 B1 | 6/2002 | Lentini et al. |
| 6,478,470 B1 | 11/2002 | Bode |
| 6,612,583 B2 | 9/2003 | Donner |
| 6,626,575 B2 | 9/2003 | Hartl |
| 7,097,363 B2 | 8/2006 | Ostrander et al. |
| 7,168,856 B1 | 1/2007 | Weinberger et al. |
| 7,422,373 B2 | 9/2008 | Cook |
| 7,637,665 B2 | 12/2009 | Cook |
| 7,775,721 B2 | 8/2010 | Gietl et al. |
| 8,061,903 B2 * | 11/2011 | Kolar ........................... 384/558 |
| 2005/0058382 A1 * | 3/2005 | Williams ...................... 384/568 |
| 2005/0089254 A1 | 4/2005 | Takehara et al. |
| 2008/0050062 A1 | 2/2008 | Cook |
| 2010/0135606 A1 | 6/2010 | Ehlert et al. |

FOREIGN PATENT DOCUMENTS

| | | | |
|---|---|---|---|
| EP | 0167700 A2 | 1/1986 | |
| EP | 0301731 A2 | 2/1989 | |
| EP | 562218 A1 * | 9/1993 | ............ F16C 33/76 |
| EP | 0577912 A1 | 1/1994 | |
| FR | 2477652 A1 | 9/1981 | |
| GB | 2302372 A | 1/1997 | |
| JP | 2006300129 A | 11/2006 | |
| WO | 9826202 A1 | 6/1998 | |
| WO | 0221007 A1 | 3/2002 | |
| WO | 2005028292 A2 | 3/2005 | |

OTHER PUBLICATIONS

R.L. Hudson & Company, O-Ring Design & Materials Guide, www.rlhudson.com/O-Ring%20Book/designing-dynamic.html, printed Feb. 22, 2011.

American Seal & Packing, Hydraulic Seals, www.americansealandpacking.com/hydraulic_seals.htm, printed Jan. 7, 2011.

PCT International Search Report and Written Opinion, PCT/US2010/041510, Feb. 28, 2011.

European Patent Office, Extended European Search Report, EP 10157333.5, Nov. 14, 2012.

European Patent Office, Extended European Search Report, EP 12189693.0, Feb. 21, 2013.

Japanese Patent Office, Notification of Reasons for Refusal, JP 2006-526428, Apr. 13, 2010.

Rexnord Bearing Operation, Downers Grove, IL, Drawing No. 39660-101, Rev. B., Bearing Model No. SA16-31A1-502, Feb. 3, 1989.

McGill Catalog, Sphere-Rol Bearings, Engineering Section, p. 86, 1996.

* cited by examiner

BEARING ASSEMBLY HAVING A FLOATING SEAL

CROSS REFERENCES TO RELATED APPLICATIONS

Not Applicable.

STATEMENT REGARDING FEDERALLY SPONSORED RESEARCH

Not Applicable.

BACKGROUND OF THE INVENTION

The present invention relates to bearing assemblies, and more particularly to bearing assemblies incorporating a floating seal.

Bearing assemblies are used in a wide variety of applications to generally reduce frictional resistance that occurs during relative movement. The specific type of bearing assembly used is application dependent and may include ball bearings, cylindrical roller bearings, needle bearings, tapered roller bearings, spherical roller bearings, and the like that can be configured to accommodate, for instance, radial loads, thrust loads, or some combination thereof.

Bearing assemblies are often exposed to harsh operating environments. As a result, many bearing assemblies include some form of a seal to prevent contaminants (e.g., dust and debris) from becoming lodged between internal moving parts. Even relatively small particles can have a significant impact on the performance and the useful operating life of a bearing assembly.

Bearing assemblies used in elevated temperature applications (e.g., environments or operating conditions approaching or exceeding approximately 1200 degrees Fahrenheit) are subject to additional demands. Bearing assemblies employed in, for instance, hot gas valve systems (e.g., hot air bleed and regulating valves), valves for ground-based power generation systems, and aircraft air-control systems often operate at elevated temperatures. These elevated temperatures can result in thermal gradients within the bearing assembly and cyclical heating and cooling of the bearing assembly, which in turn cause the various components of the bearing assembly to expand and contract at different rates due to non-uniform coefficients of thermal expansion. Even components having similar coefficients may expand and contract in a manner that negatively impacts the relative placement or arrangement of bearing assembly components. As a result, conventional seal configurations that are intended to inhibit contaminants from fouling the bearing assembly can be degraded or ineffective in elevated temperature applications. Of course, similar detrimental effects can become pronounced in decreased temperature applications.

Other factors may operate independently or in concert with the thermal issues to further impair the functionality of a bearing assembly seal. For instance, the radial/axial forces acting on the bearing assembly can have a tendency to misalign bearing assembly components, which can result in misalignment of the seal. Additionally, forces resulting from movement, shock, and vibration can, at least temporarily, result in misalignment of bearing assembly components (e.g., the seal) such that undesirable contaminants may infiltrate the bearing assembly.

One approach to mitigate contamination resulting from thermal or structural misalignment of the bearing assembly components has been to provide a cover that substantially encases the bearing assembly. While marginally effective in certain applications, the covers have a tendency to complicate the construction and installation of the bearing assembly, require additional cost, impede routine maintenance and service, and may negatively impact the performance of the overall device in which the bearing assembly is a component. In some applications, a relatively limited useful life of bearing assemblies has been accepted as typical, which results in routine repair and/or replacement of worn out bearing assemblies.

In light of at least the above, a need exists for a bearing assembly having an improved design concept that impedes contaminants from negatively impacting the internal bearing assembly components in a variety of scenarios, including elevated temperature applications.

SUMMARY OF THE INVENTION

The bearing assembly concept described includes a floating seal arrangement.

In one aspect, a bearing assembly comprises an outer ring having an outer race and an inner ring having an inner race. The inner ring is oriented radially inward of the outer ring. A plurality of bearings is positioned between the outer ring and the inner ring, and is seated in the inner race and the outer race. A shield is coupled to one of the outer ring and the inner ring. A floating seal is slidably engaged with the shield and the other ring. The shield captures the floating seal adjacent to the other ring.

In another aspect, a bearing assembly comprises a first bearing member and a second bearing member that is oriented adjacent to the first bearing member. A plurality of bearings is positioned between the first bearing member and the second bearing member. A shield is engaged with the first bearing member, and a floating seal is slidably engaged with the shield and the second bearing member. The shield captures the floating seal adjacent to the second bearing member.

In a further aspect, a bearing assembly comprises an outer ring having an outer race and an inner ring having an inner race. The inner ring is oriented radially inward of the outer ring. A plurality of bearings is positioned between the outer ring and the inner ring, and is seated in the inner race and the outer race. A shield is coupled to the outer ring. A floating seal is slidably engaged with the shield and the inner ring. The shield captures the floating seal adjacent to the inner ring.

These and still other aspects will be apparent from the description that follows. In the detailed description, preferred example embodiments will be described with reference to the accompanying drawings. These embodiments do not represent the full scope of the concept; rather the concept may be employed in other embodiments. Reference should therefore be made to the claims herein for interpreting the breadth of the invention.

DETAILED DESCRIPTION OF THE PREFERRED EXAMPLE EMBODIMENT

The example bearing assembly (10) described below is in the form of a double-row, cylindrical roller bearing assembly. However, as one skilled in the art will appreciate when given the benefit of this disclosure, the inventive concepts described herein can be incorporated with any other form of bearing assembly, such as the various bearing assemblies manufactured by Rexnord Industries, LLC of Milwaukee, Wis. Furthermore, throughout the description, terms such as front, back, side, top, bottom, up, down, upper, lower, inner, outer, above, below, and the like are used to describe the relative arrangement and/or operation of various components of the example embodiment; none of these relative terms are to be construed as limiting the construction or alternative arrangements that are within the scope of the claims.

Figure 1:
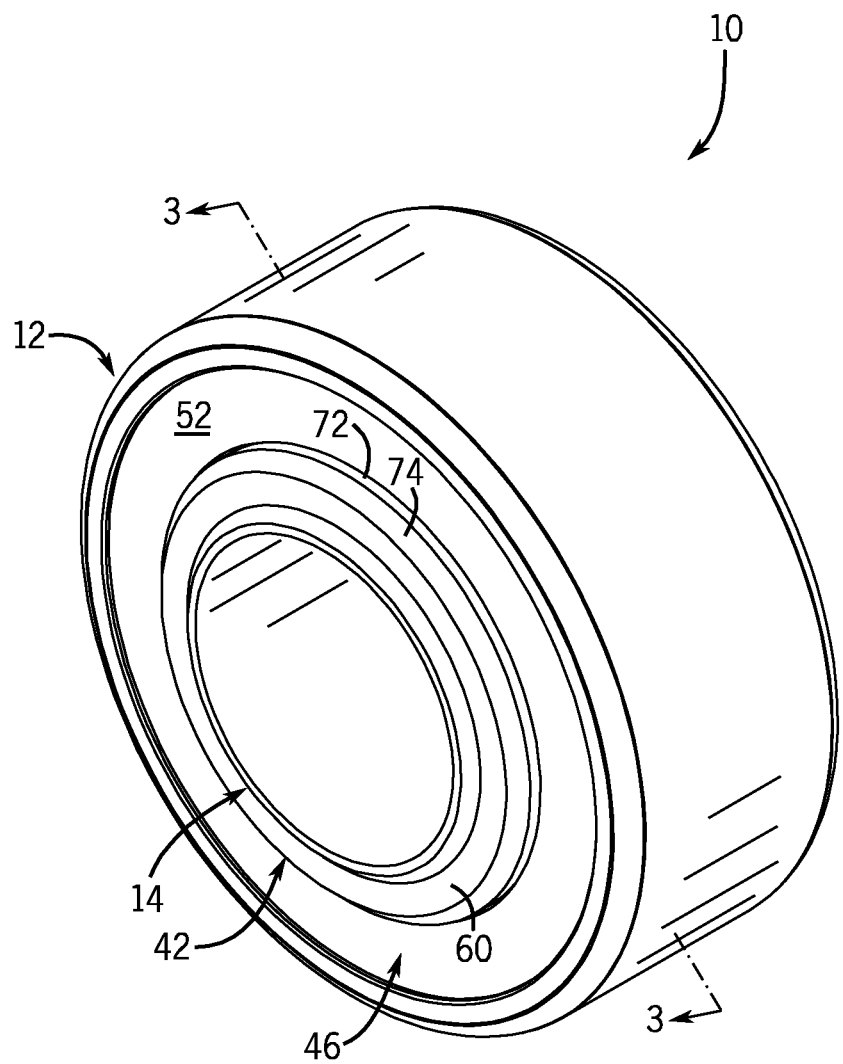
FIG. 1 is an isometric view of an example bearing assembly.

The example bearing assembly (10) illustrated in FIG. 1 is configured to provide relative rotation between two objects (e.g., a fixed object and a rotating object). For instance, the example bearing assembly (10) includes a bearing member in the form of an outer ring (12) that may be fixed (e.g., captured in a pillow block) and another bearing member in the form of an inner ring (14) that may be secured to a rotating member (e.g., a shaft rotating relative to the pillow block). The inner ring (14) is oriented radially inward of the outer ring (12) in typical double-row, cylindrical roller bearing arrangement. As understood by one skilled in the art, the overall form factor of a bearing assembly is generally influenced by the specific application requirements in which the bearing assembly is designed to operate. For example, an application may call for bearing members in the form of parallel plates that rotate about a common axis and engage ball bearings between the plates to provide relative rotation of the plates. Therefore, it is appreciated that the example bearing assembly (10) described is merely one embodiment of the broader bearing assembly concept.

Figure 2:
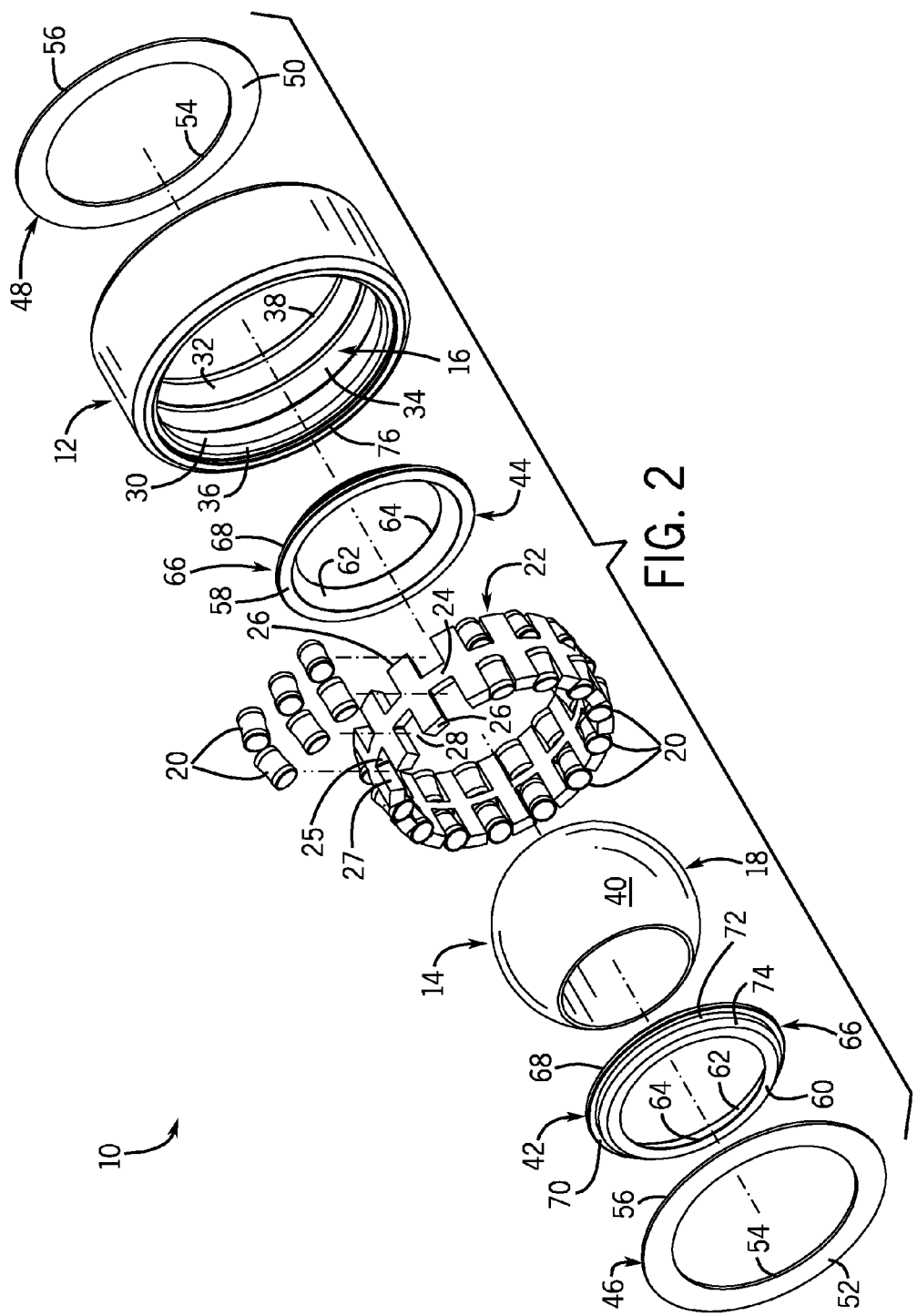
FIG. 2 is an exploded, isometric view of the example bearing assembly illustrated in FIG. 1.
Figure 3:
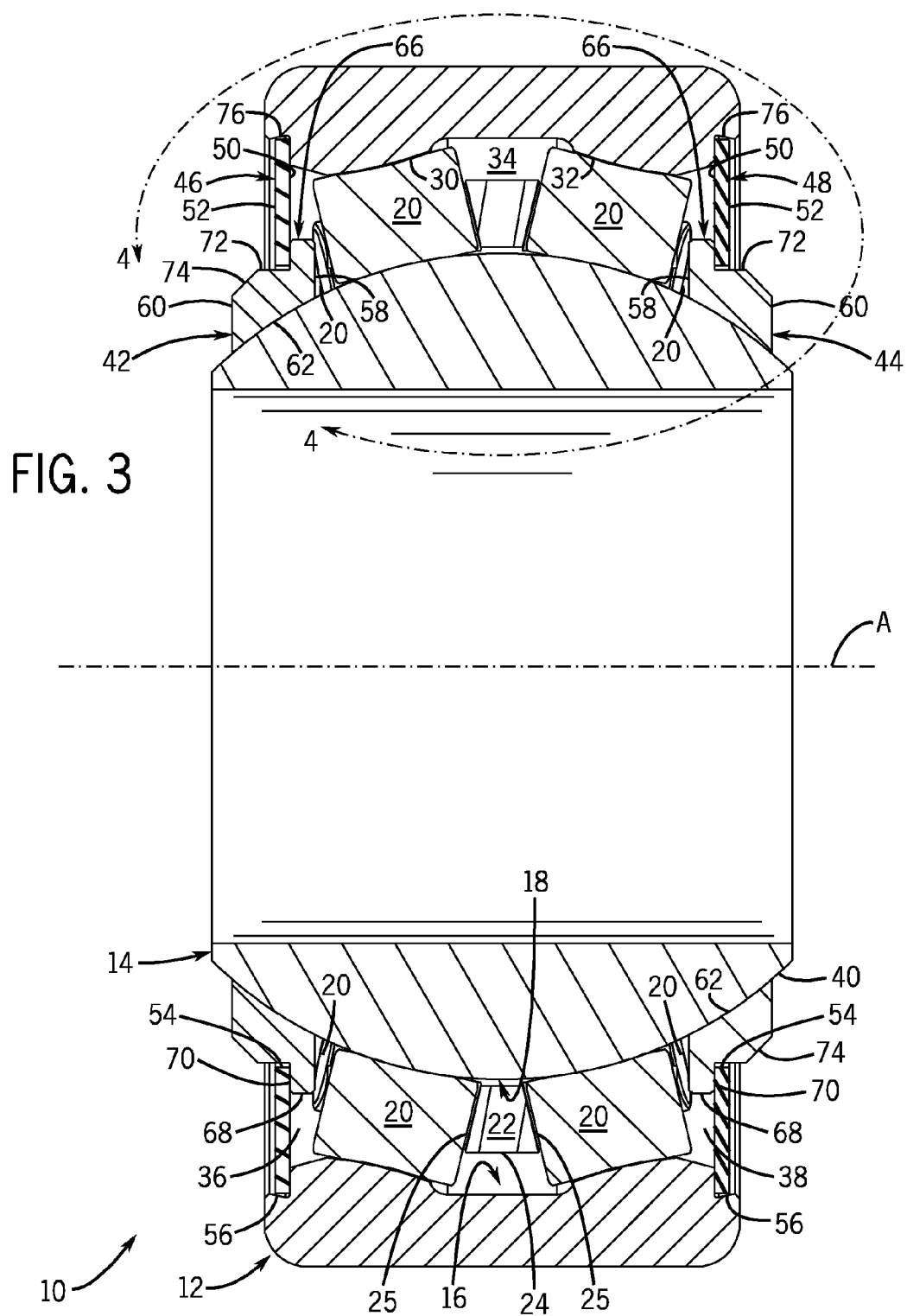
FIG. 3 is a cross section taken along line 3-3 of the example bearing assembly illustrated in FIG. 1.
Figure 4:
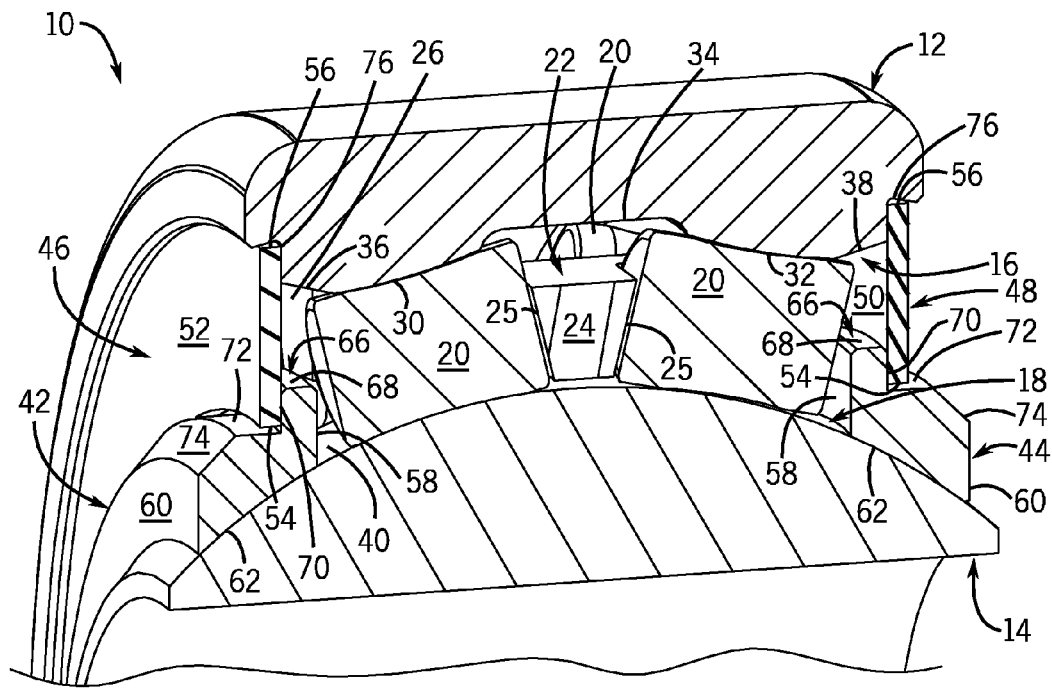
FIG. 4 is a detailed, isometric cross section of the portion circumscribed by arc 4-4 of the example bearing assembly illustrated in FIG. 3.
Figure 5:
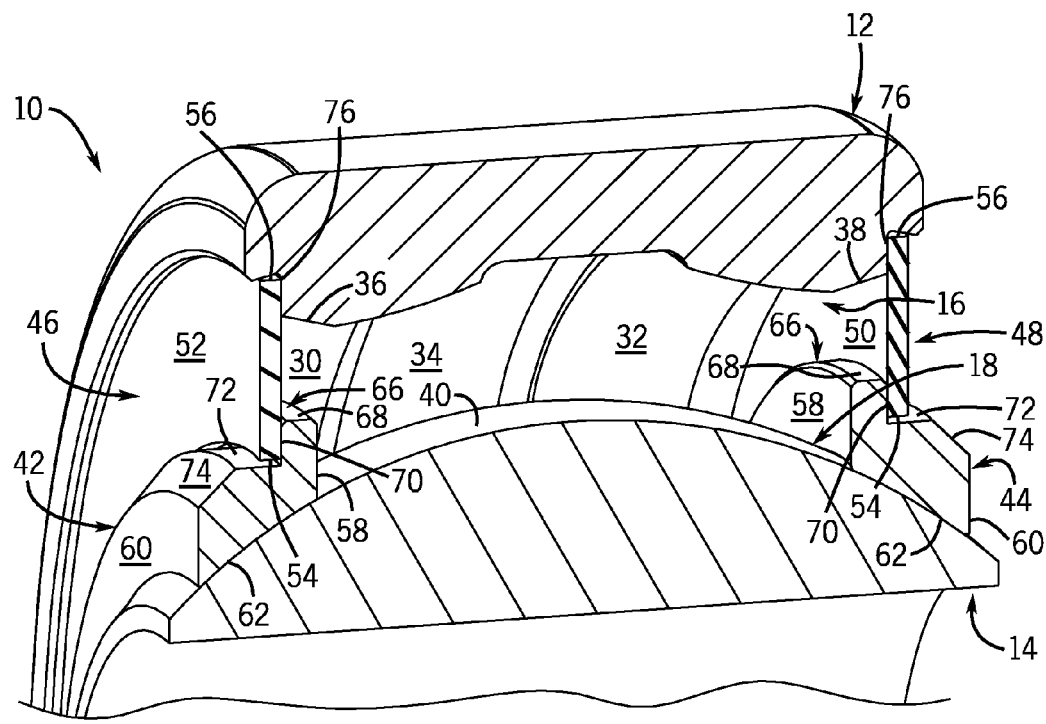
FIG. 5 is a detailed, isometric cross section similar to FIG. 4 with a portion of the example bearing assembly removed.

With additional reference to FIGS. 2-5, the example bearing assembly (10) includes various components that are generally positioned between the outer ring (12) and the inner ring (14) to facilitate relative rotation between the outer ring (12) and the inner ring (14) (i.e., example bearing members). Specifically, the outer ring (12) defines an outer race (16) and the inner ring (14) defines an inner race (18) in which pluralities of cylindrical roller bearings (20) are seated and roll against during operation of the bearing assembly (10). In the example double-row, cylindrical roller bearing assembly (10), the cylindrical roller bearings (20) are held in relative arrangement by a separator or retainer ring (22) that is positioned between the outer ring (12) and the inner ring (14). The retainer ring (22) includes a central band (24) and multiple transverse fingers (26) that are circumferentially spaced apart, thereby defining gaps (28) between successive transverse fingers (26) in which the cylindrical roller bearings (20) are located. As best illustrated in FIGS. 2 and 3, the central band (24) and transverse fingers (26) are tapered radially inward along respective taper surfaces (25, 27) such that the cylindrical roller bearings (20) are skewed relative to a longitudinal axis (A) of the bearing assembly (10) and are aligned to ride within the outer race (16) and the inner race (18).

The outer race (16) and the inner race (18) define respective bearing surfaces against which the cylindrical roller bearings (20) engage to reduce relative friction between the outer ring (12) and the inner ring (14). The cylindrical roller bearings (20) have been removed from the cross section shown in FIG. 5 to better illustrate the contours of the example outer race (16) and the example inner race (18). The outer race (16) includes annular, arcuate bearing surfaces (30, 32) that are separated by an annular land surface (34). Beveled shoulders (36, 38) are formed along the outer perimeters of the bearing surfaces (30, 32). The inner race (18) of the example embodiment generally defines a spherical bearing surface (40) against which the cylindrical roller bearings (20) also engage during operation of the bearing assembly (10). The retainer ring (22) generally aligns each row of the cylindrical roller bearings (20) adjacent to the respective annular bearing surfaces (30, 32) and the spherical bearing surface (40). The skewed orientation of the cylindrical roller bearings (20) (relative to the longitudinal axis (A) of the bearing assembly (10)) provides resistance to axial loads and thrust loads imparted to the example bearing assembly (10).

The outer ring (12) and the inner ring (14) may be made of AISI M62 steel or any other material having sufficient application-specific hardness for use in elevated temperature environments (e.g., upwards of approximately 1500 degrees Fahrenheit). Given the benefit of this disclosure, one skilled in the art will appreciate the various bearing assembly configurations and orientations available depending on the specific application design.

As generally noted above, it is beneficial in many instances to inhibit contaminants from between the bearing members, such as the outer ring (12) and the inner ring (14). Contaminants within the outer race (16) and/or the inner race (18) may damage the cylindrical roller bearings (20) and ultimately reduce the useful life of the overall example bearing assembly (10). The example bearing assembly (10) includes floating seals (42, 44) and shields (46, 48) on each side of the bearing assembly (10) to inhibit contaminants from entering and fouling the operation of the bearing assembly (10). A single floating seal (42) and a single shield (46) will be described in detail with the understanding that the other floating seal (44) and shield (48) are generally similar. Furthermore, certain bearing assembly applications may only benefit from a single floating seal/shield arrangement, such as when a portion of the bearing assembly is housed within a sealed case.

Figure 6:
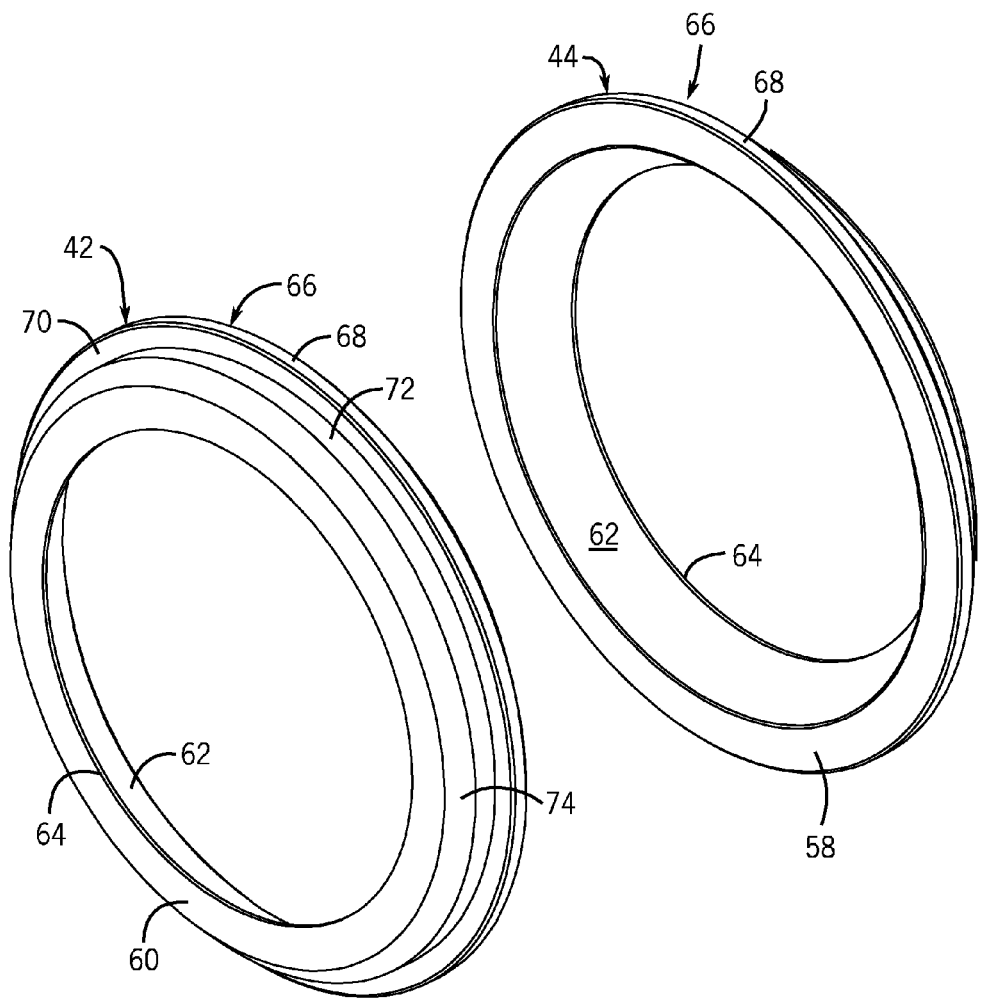
FIG. 6 is an isometric view of example floating seals used in the example bearing assembly illustrated in FIG. 1.

With continued reference to FIGS. 1-5 and additional reference to FIG. 6, which illustrates the example floating seals (42, 44), the arrangement of the floating seal (42) configured to engage the inner race (18) and the shield (46) is described in greater detail. The example shield (46) is generally ring-shaped having an inner face (50) spaced apart from and parallel to an outer face (52). The inner face (50) and the outer face (52) are connected by an inner peripheral surface (54) and an outer peripheral surface (56), thus establishing the general ring shape of the shield (46). The shield (46) can be made of a variety of materials, including for example stainless steel (e.g., 304/304L, 316/316L, 430, etc.), metal alloys (e.g., 4140, 4142, 4150, 4340, etc.), bi-metals (e.g., Cobalt based spring alloys, such as NEOMAX KRN-1 and KRN-2 manufactured by Neomax Materials, Co., Ltd. based in Osaka, Japan), and any other materials suitable to withstand the specific application requirements (e.g., temperatures approaching or exceeding 1500 degrees Fahrenheit). In some forms, a coating may be applied to the inner face (50) of the shield (46), which engages the floating seal (42) during use to reduce friction and accommodate high-temperature operation. The coating may include chrome plating, ceramic coating, application specific coatings (e.g., PT1 101—Tribaloy T-800 manufactured by Deloro Stellite Group of Houston, Tex. and PT1 285—Tribaglide manufactured by Plasma Technology, Inc. of Torrance, Calif.), or any other coating that is capable of reducing friction and withstanding the particular application requirements.

The example floating seal (42) is also generally ring-shaped, but includes additional contours that assist engagement with the shield (46), the outer ring (12), and the inner ring (14). Specifically, the floating seal (42) includes an interior face (58) that is ring-shaped and spaced apart from a generally parallel exterior face (60), which is similarly ring-shaped. An arcuate bearing face (62) extends from the interior face (58) radially inward toward a cylindrical annular face (64) that connects the arcuate bearing face (62) to the exterior face (60). The bearing face (62) is contoured to generally wipe and seal against the spherical inner race (18) during operation of the bearing assembly (10).

An annular flange (66) protrudes radially outward from the balance of the floating seal (42) and is defined in part by the interior face (58). The annular flange (66) further defines a cylindrical peripheral face (68) that extends substantially perpendicular to the interior face (58). The cylindrical peripheral face (68) connects the interior face (58) to a ring-shaped shield face (70) of the annular flange (66), such that the shield face (70) is generally parallel to the interior face (58). The shield face (70) is engaged by the shield (46) when the floating seal (42) and the shield (46) are installed in the balance of the bearing assembly (10). The shield face (70) extends radially inward to a cylindrical radial face (72) that is parallel to the axis (A). A beveled face (74) angles radially inward toward the axis (A) to connect the radial face (72) to the exterior face (60). Given the benefit of this disclosure, one skilled in the art will appreciate the various modifications that may be made to the example floating seal (42) based on specific application and design requirements.

The floating seal (42) may be made of a variety of materials including, for instance, alloy steels (e.g., AISI M2, AISI M42, AISI BG42, AISI M50, etc.), stainless steel (e.g., 420, 440/440C, 17-4 PH, 17-5 PH, etc.), INCONEL manufactured by Special Metals Corporation of Huntington, W. Va. (e.g., UNS N06625, UNS N09706, UNS N0718, etc.), ceramics (e.g., silicon nitride, silicon carbide, zirconia oxide, etc.), and similar materials suitable for the particular application (e.g., applications in which temperatures are in the range of 1500 degrees Fahrenheit). Moreover, the arcuate bearing face (62) and/or the shield face (70), for example, may include a coating, such as chrome plating, ceramic coating, application specific coatings (e.g., PT1 101—Tribaloy T-800 manufactured by Deloro Stellite Group of Houston, Tex. and PT1 285—Tribaglide manufactured by Plasma Technology, Inc. of Torrance, Calif.), or any other coating that is capable of reducing friction and withstanding the particular application requirements.

The example floating seal (42) is installed to the balance of the bearing assembly (10) by engaging the arcuate bearing face (62) against the inner race (18) and then capturing the annular flange (66) of the floating seal (42) to the inner race (18) with the shield (46). In the example embodiment, the shield (46) is illustrated as being coupled to or engaged with the outer ring (12). Specifically, the outer ring (12) defines an annular groove (76) into which the shield (46) is pressed into and axially restrained adjacent to the annular flange (66) of the floating seal (42). In other forms, the shield (46) may be axially restrained by a lip or other restraint that allows the shield (46) to freely rotate about the axis (A). Alternatively, the shield (46) may be welded, adhered, or otherwise engaged with or coupled to the outer ring (12) to ultimately restrain movement of the floating seal (42) along and about the axis (A).

In the example embodiment, the floating seal (42) is allowed to generally float, drift, and/or glide relative to the shield (46) and the inner race (18). As a result, the floating seal (42) may maintain sufficient sealing engagement when various components of the bearing assembly (10) are misaligned, for instance, as a result of thermodynamic or other forces acting on the bearing assembly (10) (e.g., loading the inner ring (14) normal to the axis (A)). In general, the shield (46) is axially coupled with the outer ring (12) and captures the floating seal (42) adjacent to the inner ring (14) such that the floating seal (42) is slidably engaged with the shield (46) and the inner ring (14), which is the ring that is uncoupled from the shield (46). Specifically, the arcuate bearing face (62) wipes against the inner race (18) such that contaminants are inhibited from passing between the floating seal (42) and the inner race (18). Moreover, engagement between the inner face (50) of the shield (46) and the shield face (70) of the floating seal (42) further inhibits contaminants from fouling the operation of the bearing assembly (10).

Given the benefit of this disclosure, one skilled in the art will appreciate that the example construction may be adapted such that a shield is coupled to or engaged with an inner ring and a floating seal is captured by the shield adjacent to the outer ring, thereby providing desired sealing with a structure that is generally the inverse of that illustrated in the example bearing assembly (10). The floating seal arrangement defines the seal as being engaged with the bearing member that is not supporting the shield; in the example bearing assembly (10), the shield (46) is supported by the outer ring (12) to capture the floating seal (42) against the inner ring (14).

Figure 7A:
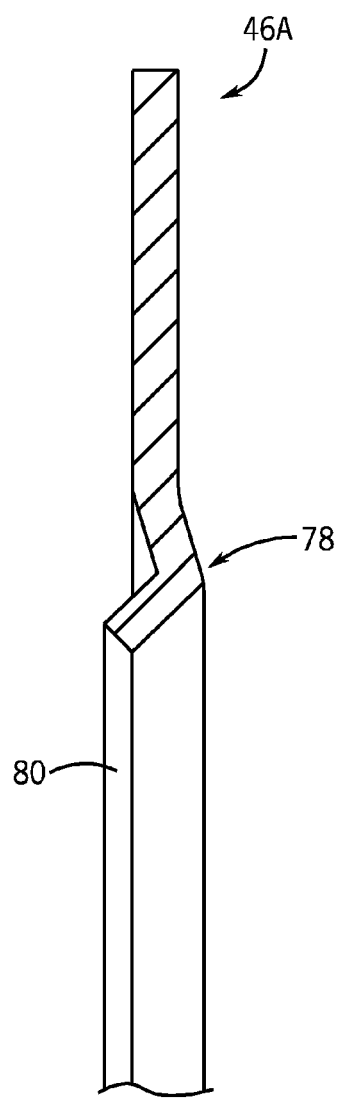
FIGS. 7A and 7B are partial section views of alternative example shields that are compatible with the example bearing assembly illustrated in FIG. 1.
Figure 7B:
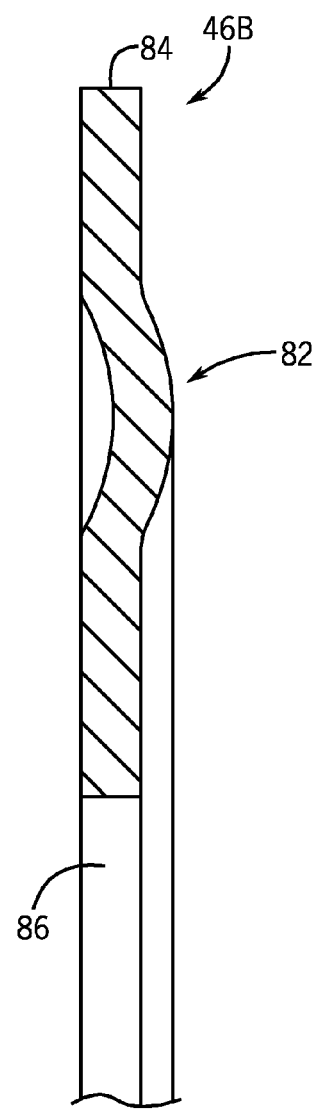

In addition, one skilled in the art will appreciate various modifications to the above concepts that may be made. For instance, alternative shield form factors (46A, 46B) are illustrated in FIGS. 7A and 7B having contoured profiles that are configured to bias the floating seal (42) toward the inner race (18). The first alternative shield (46A) includes a ridge (78) near an inner periphery (80) that is contoured to provide additional force to bias the floating seal (42) into engagement with the inner race (18) of the example bearing assembly (10). The second alternative shield (46B) includes a hump (82) substantially intermediate of an outer periphery (84) and an inner periphery (86). The hump (82) is also contoured to provide additional force to bias the floating seal (42) into engagement with the inner race (18) of the example bearing assembly (10).

While there has been shown and described what is at present considered the preferred embodiments, it will be appreciated by those skilled in the art, given the benefit of this disclosure, that various changes and modifications can be made without departing from the scope of the invention defined by the following claims.

I claim:
1. A bearing assembly, comprising:
an outer ring having an outer race;
an inner ring having an inner race, the inner ring oriented radially inward of the outer ring relative to a longitudinal axis;
a plurality of bearings positioned between the outer ring and the inner ring, the plurality of bearings seated in the inner race and the outer race;
a shield coupled to the outer ring and defining an axially inner face and an axially outer face; and a floating seal slidably engaged with the shield and the inner ring during operation of the bearing assembly, the floating seal made of at least one of a metallic material and a ceramic material;

wherein the floating seal defines an arcuate bearing face engaged with the inner ring, a radial face positioned radially outward from the arcuate bearing face, and a flange extending radially outward from the radial face defining an axial shield face that is engaged with the axially inner face of the shield;

wherein the arcuate bearing face that is engaged with the inner ring extends longitudinally beyond the axially inner face and the axially outer face of the shield; and wherein the shield restrains the floating seal adjacent to the shield and the inner ring such that the floating seal can glide relative to the shield and the inner ring during relative rotation between the outer ring and the inner ring.

2. The bearing assembly of claim 1, wherein the floating seal is made of at least one of an alloy steel and a stainless steel.

3. The bearing assembly of claim 2, wherein the flange is an annular flange.

4. The bearing assembly of claim 1, wherein the arcuate bearing face of the floating seal is coated with at least one of a chrome plating and a ceramic coating.

5. The bearing assembly of claim 4, wherein:
the inner ring rotates relative to the outer ring about the longitudinal axis; and
the shield face is substantially planar and oriented substantially perpendicular to the longitudinal axis.

6. The bearing assembly of claim 1, wherein:
a groove is formed in the outer ring; and
the shield is captured in the groove.

7. The bearing assembly of claim 1, wherein the shield defines a contoured profile configured to bias the floating seal toward the inner ring.

8. A bearing assembly, comprising:
a first bearing member;
a second bearing member oriented adjacent to the first bearing member;
a plurality of bearings positioned between the first bearing member and the second bearing member;
a shield engaged with the first bearing member; and
a floating seal slidably engaged with the shield and the second bearing member during operation of the bearing assembly, the floating seal made of at least one of a metallic material and a ceramic material;
wherein the floating seal defines an arcuate bearing face engaged with the second bearing member, a radial face positioned radially outward from the arcuate bearing face, and a flange extending radially outward from the radial face defining an axial shield face that is engaged with the shield;
wherein the arcuate bearing face engaged with the second bearing member extends in the direction of a longitudinal axis beyond axial ends of the shield; and
wherein the shield restrains the floating seal adjacent to the shield and the second bearing member allowing the floating seal to move relative to the shield and the second bearing member during rotation of at least one of the first bearing member and the second bearing member.

9. The bearing assembly of claim 8, wherein:
the first bearing member is an outer ring; and
the second bearing member is an inner ring that is oriented radially inward of the outer ring.

10. The bearing assembly of claim 8, wherein the floating seal is made of at least one of an alloy steel and a stainless steel.

11. The bearing assembly of claim 8, wherein the arcuate bearing face of the floating seal is coated with at least one of a chrome plating and a ceramic coating.

12. The bearing assembly of claim 11, wherein:
the first bearing member rotates relative to the second bearing member about the longitudinal axis; and
the shield face is substantially planar and oriented substantially perpendicular to the longitudinal axis.

13. The bearing assembly of claim 8, wherein:
a groove is formed in the first bearing member; and
the shield is captured in the groove.

14. The bearing assembly of claim 8, wherein the shield defines a contoured profile configured to bias the floating seal toward the second bearing member.

15. A bearing assembly, comprising:
an outer ring having an outer race;
an inner ring having an inner race, the inner ring oriented radially inward of the outer ring;
a plurality of bearings positioned between the outer ring and the inner ring, the plurality of bearings seated in the inner race and the outer race;
a shield coupled to the outer ring; and
a floating seal slidably engaged with the shield and the inner ring during operation of the bearing assembly, the floating seal made of at least one of a metallic material and a ceramic material;
wherein the floating seal defines an arcuate bearing face engaged with the inner ring, a radial face positioned radially outward from the arcuate bearing face, and a flange extending radially outward from the radial face defining an axial shield face that is engaged with the shield;
wherein the arcuate bearing face engaged with the inner ring extends longitudinally beyond axial ends of the shield; and
wherein the shield restrains the floating seal adjacent to the shield and the inner ring allowing the floating seal to glide relative to the shield and the inner ring during operation of the bearing assembly.

16. The bearing assembly of claim 15, wherein the floating seal is made of at least one of an alloy steel and a stainless steel.

17. The bearing assembly of claim 15, wherein:
the inner ring rotates relative to the outer ring about a longitudinal axis; and
the shield face is substantially planar and oriented substantially perpendicular to the longitudinal axis.

18. The bearing assembly of claim 15, wherein the arcuate bearing face of the floating seal is coated with at least one of a chrome plating and a ceramic coating.

19. The bearing assembly of claim 15, wherein the shield is captured in a groove formed in the outer ring by one of a press fit and a lip formed on the outer ring.

20. The bearing assembly of claim 15, wherein the shield defines a contoured profile configured to bias the floating seal toward the inner ring.

* * * * *